(12) United States Patent
Discekici et al.

(10) Patent No.: US 12,240,169 B2
(45) Date of Patent: Mar. 4, 2025

(54) THREE-DIMENSIONAL PRINTING WITH DETECTOR SOLUTIONS

(71) Applicant: HEWLETT-PACKARD DEVELOPMENT COMPANY, L.P., Spring, TX (US)

(72) Inventors: Emre Hiro Discekici, San Diego, CA (US); Graciela Emma Negri Jimenez, San Diego, CA (US); Shannon Reuben Woodruff, San Diego, CA (US); Alay Yemane, San Diego, CA (US); Jacob Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 388 days.

(21) Appl. No.: 17/777,802

(22) PCT Filed: Dec. 13, 2019

(86) PCT No.: PCT/US2019/066159
§ 371 (c)(1),
(2) Date: May 18, 2022

(87) PCT Pub. No.: WO2021/118584
PCT Pub. Date: Jun. 17, 2021

(65) Prior Publication Data
US 2022/0411655 A1    Dec. 29, 2022

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B29C 64/30* (2017.08);
(Continued)

(58) Field of Classification Search
CPC ............................ B29C 64/153; B29C 64/165
See application file for complete search history.

(56) References Cited

U.S. PATENT DOCUMENTS 5,976,230 A * 11/1999 Askeland .................. B41J 2/01
106/31.27
9,455,054 B2    9/2016 Ishii et al.
(Continued)

FOREIGN PATENT DOCUMENTS

CN    1708391 A    12/2005
CN    101612598 A    12/2009
(Continued)

*Primary Examiner* — Atul P. Khare
(74) *Attorney, Agent, or Firm* — HP Inc. Patent Department (57) ABSTRACT

This disclosure describes multi-fluid kits for three-dimensional printing, three-dimensional printing kits, and methods of testing powder bed material for contamination. In one example, a multi-fluid kit for three-dimensional printing can include a fusing agent and a detector solution. The fusing agent can include water, an electromagnetic radiation absorber, and a first pigment reactant. The electromagnetic radiation absorber can absorb radiation energy and convert the radiation energy to heat. The detector solution can include water and a second pigment reactant. The second pigment reactant can be reactive with the first pigment reactant to form a colored pigment.

14 Claims, 4 Drawing Sheets

(51) Int. Cl.

| | |
|---|---|
| *B29C 64/30* | (2017.01) |
| *B29C 64/357* | (2017.01) |
| *B33Y 10/00* | (2015.01) |
| *B33Y 40/00* | (2020.01) |
| *B33Y 70/00* | (2020.01) |
| *B33Y 99/00* | (2015.01) |
| *C09D 11/322* | (2014.01) |
| *C09D 11/38* | (2014.01) |
| *C09D 11/40* | (2014.01) |
| *C09D 11/50* | (2014.01) |
| *G01N 21/78* | (2006.01) |
| *G01N 21/91* | (2006.01) |
| *G01N 21/94* | (2006.01) |
| *B29K 77/00* | (2006.01) |
| *B29K 105/00* | (2006.01) |

(52) U.S. Cl.
CPC ............ *B29C 64/357* (2017.08); *B33Y 10/00* (2014.12); *B33Y 40/00* (2014.12); *B33Y 70/00* (2014.12); *B33Y 99/00* (2014.12); *C09D 11/322* (2013.01); *C09D 11/38* (2013.01); *C09D 11/40* (2013.01); *C09D 11/50* (2013.01); *G01N 21/78* (2013.01); *G01N 21/91* (2013.01); *G01N 21/94* (2013.01); *B29K 2077/00* (2013.01); *B29K 2105/0032* (2013.01)

(56) References Cited

U.S. PATENT DOCUMENTS

| | | | |
|---|---|---|---|
| 9,458,419 | B2 | 10/2016 | Edgington et al. |
| 12,110,404 | B2* | 10/2024 | Nauka ................. B29C 64/291 |
| 2016/0001505 | A1 | 1/2016 | Hakkaku et al. |
| 2016/0067779 | A1 | 3/2016 | Dautova et al. |
| 2018/0071984 | A1 | 3/2018 | Lee et al. |
| 2018/0133957 | A1 | 5/2018 | Ramirez et al. |
| 2020/0147869 | A1* | 5/2020 | Muir ..................... B22F 10/28 |
| 2020/0299440 | A1 | 9/2020 | Wang |
| 2021/0189164 | A1 | 6/2021 | Chaffins et al. |
| 2022/0274330 | A1* | 9/2022 | Woodruff ............ B29C 64/264 |
| 2022/0332044 | A1* | 10/2022 | Woodruff ............ B29C 64/165 |
| 2022/0404322 | A1* | 12/2022 | Discekici ............. B33Y 70/10 |
| 2023/0035432 | A1* | 2/2023 | Discekici ............. C09D 11/54 |
| 2024/0157447 | A1* | 5/2024 | Schwab ................ B22F 12/90 |

FOREIGN PATENT DOCUMENTS

| | | |
|---|---|---|
| CN | 101726570 A | 6/2010 |
| CN | 108778684 A | 11/2018 |
| CN | 109232791 A | 1/2019 |
| CN | 109414882 A | 3/2019 |
| JP | 6495480 B2 | 4/2019 |
| KR | 10-2016-0111258 A | 9/2016 |
| WO | 2019/051205 A1 | 3/2019 |
| WO | 2019/094367 A1 | 5/2019 |
| WO | 2019/108288 A1 | 6/2019 |
| WO | 2019/182568 A1 | 9/2019 |

\* cited by examiner

```
┌─────────────────────────────────────────────────────────────┐
│   printing a three-dimensional printed object using a process that │
│  includes applying a fluid agent to a powder bed material to form the │
│   three-dimensional object from a portion of the powder bed material │ ─── 510
│    while leaving a leftover portion of the powder bed material, wherein │
│    the powder bed material includes polymer particles and wherein the │
│          fluid agent includes a first pigment reactant          │
└─────────────────────────────────────────────────────────────┘
                               │
┌─────────────────────────────────────────────────────────────┐
│   contacting a sample of the leftover powder bed material with a │
│    detector solution including water and a second pigment reactant, │ ─── 520
│  wherein the second pigment reactant is reactive with the first pigment │
│              reactant to form a colored pigment              │
└─────────────────────────────────────────────────────────────┘
```

FIG. 5

THREE-DIMENSIONAL PRINTING WITH DETECTOR SOLUTIONS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

The present disclosure describes multi-fluid kits for three-dimensional printing, three-dimensional printing kits, and methods of testing powder bed materials for contamination. In one example, a multi-fluid kit for three-dimensional printing includes a fusing agent and a detector solution. The fusing agent includes water, an electromagnetic radiation absorber, and a first pigment reactant. The electromagnetic radiation absorber absorbs radiation energy and converts the radiation energy to heat. The detector solution includes water and a second pigment reactant. The second pigment reactant is reactive with the first pigment reactant to form a colored pigment. In some examples, the first pigment reactant or the second pigment reactant can include $NH_4Fe(SO_4)_2 \cdot 12\ H_2O$, $(NH_4)_2Fe(SO_4)_2 \cdot 6\ H_2O$, $FeSO_4$, $NaOH$, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)_6]$, $K_4[Fe(CN)_6]$, or a combination thereof. In certain examples, the first pigment reactant can be $NH_4Fe(SO_4)_2 \cdot 12\ H_2O$ and the second pigment reactant can be $K_4[Fe(CN)_6]$. In other examples, the first pigment reactant can be present in an amount from about 0.01 wt % to about 2 wt %. In further examples, the fusing agent can be a colorless fusing agent or a low tint fusing agent. In still further examples, the multi-fluid kit can also include a detailing agent including a detailing compound, wherein the detailing agent can also include the first pigment reactant.

The present disclosure also describes three-dimensional printing kits. In one example, a three-dimensional printing kit includes a powder bed material, a fusing agent to selectively apply to the powder bed material, a detailing agent to selectively apply to the powder bed material, and a detector solution. The powder bed material includes polymer particles. The fusing agent includes water and an electromagnetic radiation absorber, wherein the electromagnetic radiation absorber absorbs electromagnetic radiation energy and converts the electromagnetic radiation energy to heat. The detailing agent includes a detailing compound to reduce a temperature of powder bed material onto which the detailing agent is applied. A first pigment reactant is in the fusing agent, or in the detailing agent, or both. The detector solution includes water and a second pigment reactant, wherein the second pigment reactant is reactive with the first pigment reactant to form a colored pigment. In some examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In certain examples, the first pigment reactant can be $NH_4Fe(SO_4)_2 \cdot H_2O$ and the second pigment reactant can be $K_4[Fe(CN)_6]$. In other examples, the first pigment reactant can be present in an amount from about 0.01 wt % to about 2 wt %. In still further examples, the fusing agent can be a colorless fusing agent or a low tint fusing agent.

The present disclosure also describes methods of testing powder bed material for contamination. In one example, a method of testing powder bed material for contamination includes printing a three-dimensional printed object using that includes applying a fluid agent to a powder bed material to form the three-dimensional object from a portion of the powder bed material while leaving a leftover portion of the powder bed material, wherein the powder bed material includes polymer particles and wherein the fluid agent includes a first pigment reactant. The method also includes contacting a sample of the leftover powder bed material with a detector solution including water and a second pigment reactant, wherein the second pigment reactant is reactive with the first pigment reactant to form a colored pigment. In further examples, the method can also include contacting the detector solution and multiple samples of leftover powder bed material being contaminated with known amounts of the first pigment reactant, observing different color intensities formed from the known amounts of the first pigment reactant, and correlating the color intensities with the amounts of the first pigment reactant. In other examples, the method can also include observing a color intensity of the detector solution after contacting with the sample of the leftover powder bed material, and discarding a remainder of the leftover powder bed material if the color intensity is at or above a threshold color intensity or recycling the leftover powder bed material for forming an additional three-dimensional printed object if the color intensity is below the threshold color intensity. In certain examples, the first pigment reactant can be $NH_4Fe(SO_4)_2 \cdot 12\ H_2O$ and the second pigment reactant can be $K_4[Fe(CN)_6]$.

It is noted that when discussing the multi-fluid kits, three-dimensional printing kits, and methods herein, these discussions can be considered applicable to one another whether or not they are explicitly discussed in the context of that example. Thus, for example, when discussing a fusing agent related to a three-dimensional printing kit, such disclosure is also relevant to and directly supported in the context of multi-fluid kits and methods, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Multi-fluid Kits for Three-dimensional Printing

The multi-fluid kits described herein can be used in certain three-dimensional printing processes. The three-dimensional printing processes can include applying a fusing agent to a powder bed material that includes polymer particles. The fusing agent can include a radiation absorber, which can be a compound or material that absorbs radiation energy (such as UV or infrared radiation) and converts the energy to heat. After applying the fusing agent, and radiation source is used to irradiate the powder bed. The areas of the powder bed where the fusing agent was applied can be selectively heated to a melting or softening point temperature of the polymer particles so that the polymer particles fuse together to form a solid layer of the final three-dimensional printed object.

The three-dimensional printing processes can also involve applying other fluid agents to the powder bed material in addition to the fusing agent. Other examples of fluid agents can include detailing agents that can be applied to cool portions of the powder bed, anti-coalescing agents that can prevent coalescence of polymer particles in certain areas of the powder bed, coloring agents, crosslinking agents, functional agents intended to give the final three-dimensional printed object certain chemical functionalities or physical properties, and others. Depending on the function of these fluid agents, the agents may be applied to powder bed material that is fused together to become a part of the final three-dimensional printed object or the agents may be applied to powder bed material that remains in the powder bed after printing.

In certain examples, the powder bed material can be recycled after printing a three-dimensional printed object. Loose polymer particles that are left behind after the three-dimensional printed object is removed from the powder bed can be collected and reused in a subsequent printing operation. However, in some cases the leftover polymer particles may become contaminated with material from the fluid agents applied during the printing process. Any of the fluid agents applied during printing can potentially cause contamination of the powder bed material. In some examples, a small amount of contamination can be tolerated and the powder bed material can be recycled and successfully used to print additional three-dimensional printed objects. However, in certain examples the contamination can reach a level at which the powder bed material may be difficult to use in printing, or the contaminants can negatively affect the properties of subsequent three-dimensional printed objects.

The contaminants in the recycled powder bed material may not be easily visible or detectable. Some analytical methods can be used to detect the presence and amount of contaminants, such as mass spectrometry, Fourier-transform infrared spectroscopy, and others. However, these methods can be time-consuming and expensive. Therefore, it can be difficult to determine whether recycled powder bed material is contaminated to the point that the printing process or the quality of three-dimensional printed objects will be negatively affected.

The multi-fluid kits, three-dimensional printing kits, and methods described herein can provide an easier and cheaper way to detect the presence of contaminants in the powder bed material. In some examples, a first pigment reactant can be added to a fluid agent that is used during three-dimensional printing. This fluid agent can be any fluid agent that may contaminate the powder bed material, and for which it is desired to detect such contamination. The first pigment reactant can be a compound that reacts with a second pigment reactant to form a colored pigment. In some examples, the pigment reactants can have little or no visible color before they react together to form the colored pigment. Examples of these pigment reactants are described in more detail below. In addition to the fluid agent that is applied to the powder bed during printing, the multi-fluid kits described herein can also include a detector solution. The detector solution can include the second pigment reactant that can react with the first pigment reactant to form the colored pigment. When it is desired to determine whether powder bed material is contaminated with the fluid agent containing the first pigment reactant, then the detector solution can be contacted with a sample of the powder bed material. If the first pigment reactant is present in the powder bed material, then the first pigment reactant can react with the second pigment reactant and a visible color change can be observed. In certain examples, the amount of contamination in the powder bed material can be estimated based on the intensity of the color.

In a particular example, the first pigment reactant can be ammonium iron(III) sulfate dodecahydrate ($NH_4Fe(SO_4)_2 \cdot 12\ H_2O$). This can be included in a fusing agent or another fluid agent used during three-dimensional printing. The second pigment reactant can be potassium hexacyanoferrate(II) ($K_4[Fe(CN)_6]$). These reactants can react together to from a blue pigment known as Prussian blue. The ammonium iron(III) sulfate dodecahydrate can be included in a small amount in the fusing agent or other fluid agent. The amount can be small enough that the properties of the fusing agent are not significantly affected. However, when the ammonium iron(III) sulfate dodecahydrate reacts with the potassium hexacyanoferrate(II) in the detector solution, a visible blue color can be formed.

Figure 1:
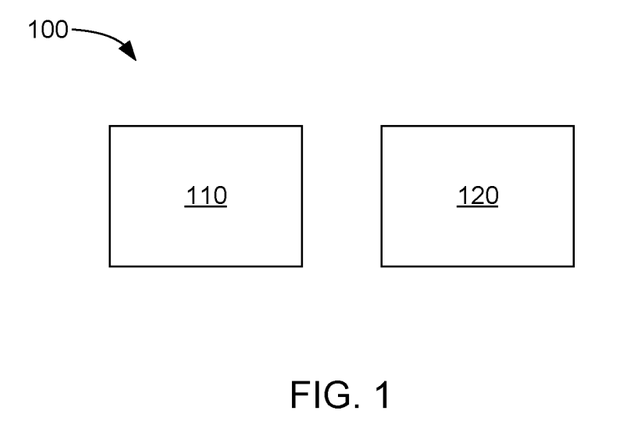
FIG. 1 is a schematic view of an example multi-fluid kit for three-dimensional printing in accordance with examples of the present disclosure.

With this description in mind, FIG. 1 shows a schematic of an example multi-fluid kit for three-dimensional printing 100. The kit includes a fusing agent 110 and a detector solution 120. The fusing agent can include water, an electromagnetic radiation absorber, and a first pigment reactant. The electromagnetic radiation absorber can absorb radiation energy and convert the radiation energy to heat. The detector solution can include water and a second pigment reactant. The second pigment reactant can be reactive with the first pigment reactant to form a colored pigment.

In some examples, the first pigment reactant and second pigment reactant can be water-soluble. In certain examples, these reactants can react together to form a colored pigment that is water-insoluble. As used herein, "water-soluble" refers to materials that can be dissolved in water at a concentration from about 5 wt % to about 99 wt % of the dissolved material with respect to the entire weight of the solution. The solution of a water-soluble material can be fully transparent without any phase separation. Materials that are not water-soluble can be referred to as "water-insoluble."

Figure 2:
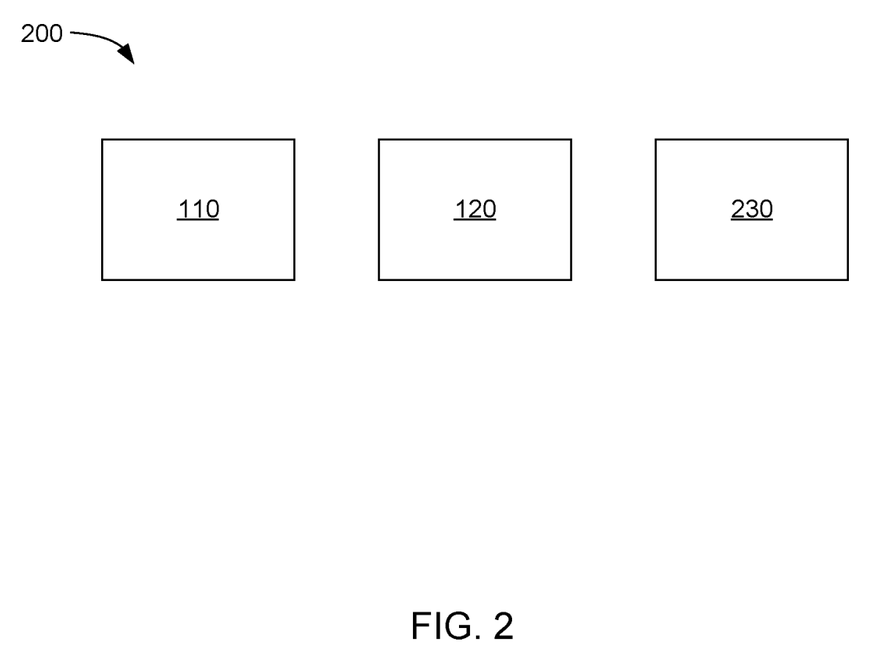
FIG. 2 is a schematic view of another example multi-fluid kit for three-dimensional printing in accordance with examples of the present disclosure.

FIG. 2 shows another example multi-fluid kit for three-dimensional printing. This example includes a fusing agent 110, a detector solution 120, and a detailing agent 230. The fusing agent can include an electromagnetic radiation absorber and a first pigment reactant as described above. The detector solution can include a second pigment reactant as described above. The detailing agent can include a detailing compound that cools powder bed material onto which the detailing agent is applied. The detailing agent can also include the first pigment reactant. Thus, the detector solution can be used to test powder bed material for contamination from both the fusing agent and the detailing agent.

The ingredients and properties of the fusing agent, detector solution, and detailing agent are described in more detail below.

Three-dimensional Printing Kits

The present disclosure also describes three-dimensional print kits that can include a combination of fluid agents and powder bed material. In some examples, the three-dimensional printing kits can include a powder bed material that includes polymer particles, a fluid agent that includes a first pigment reactant, and a detector solution that includes a second pigment reactant as described above.

Figure 3:
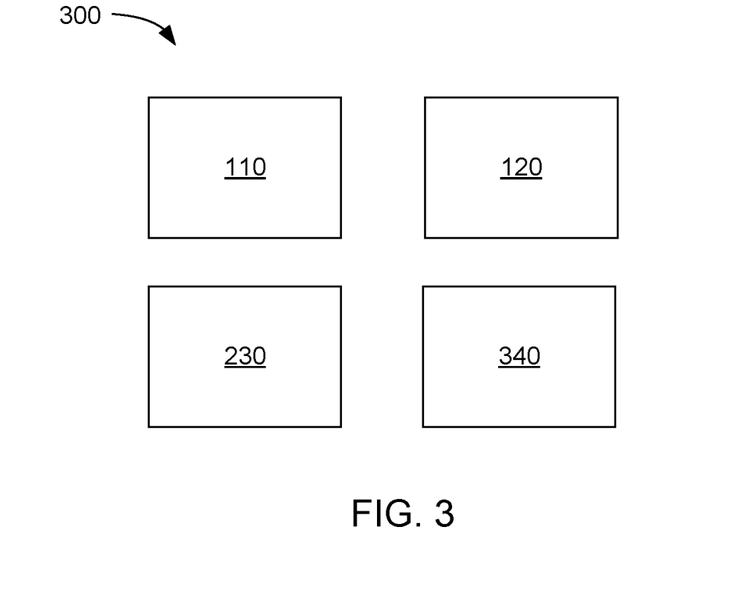
FIG. 3 is a schematic view of an example three-dimensional printing kit in accordance with examples of the present disclosure.

FIG. 3 is a schematic of one example three-dimensional printing kit 300. This three-dimensional printing kit includes a powder bed material 340, a fusing agent 110 to selectively apply to the powder bed material, a detailing agent 230 to selectively apply to the powder bed material, and a detector solution 120. The powder bed material can include polymer particles. The fusing agent can include water and an electromagnetic radiation absorber. The electromagnetic radiation absorber can absorb electromagnetic radiation energy convert the electromagnetic radiation energy to heat. The detailing agent can include a detailing compound to reduce a temperature of powder bed material onto which the detailing agent is applied. In this example, a first pigment reactant can be included in the fusing agent, or in the detailing agent, or both. The detector solution can include water and a second pigment reactant. The second pigment reactant can be reactive with the first pigment reactant to form a colored pigment.

In further examples, the three-dimensional printing kits, as well as the previously mentioned multi-fluid kit for three-dimensional printing, can further include other fluids, such as coloring agents, anti-coalescing agents, functional agents, or the like. In various examples, the first pigment reactant can be included in any of these fluid agents that are desired to be detected in the powder bed material.

Some fluid agents can be applied to powder bed material that is intended to remain as loose powder surrounding a three-dimensional printed object. A detailing agent, for example, can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused. In further examples, anti-coalescing agents can be applied around edges of the area where fusing agent is applied to prevent surrounding polymer particles from fusing together. Coloring agents can also be applied to portions of the powder bed that are to be fused to become the surface of the three-dimensional printed object, as well as on some surrounding powder bed material. Applying additional coloring agents to loose powder surrounding the area to be fused can, in some examples, increase the color uniformity on the surface of the three-dimensional printed object.

Figure 4A:
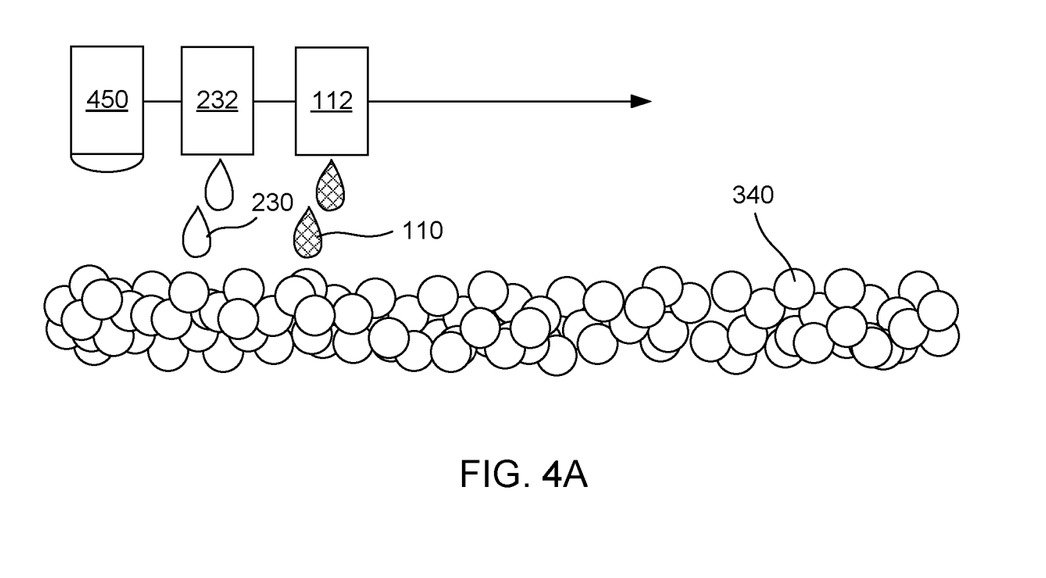
FIGS. 4A-4C show a schematic view of an example three-dimensional printing process using an example three-dimensional printing kit in accordance with examples of the present disclosure.
Figure 4B:
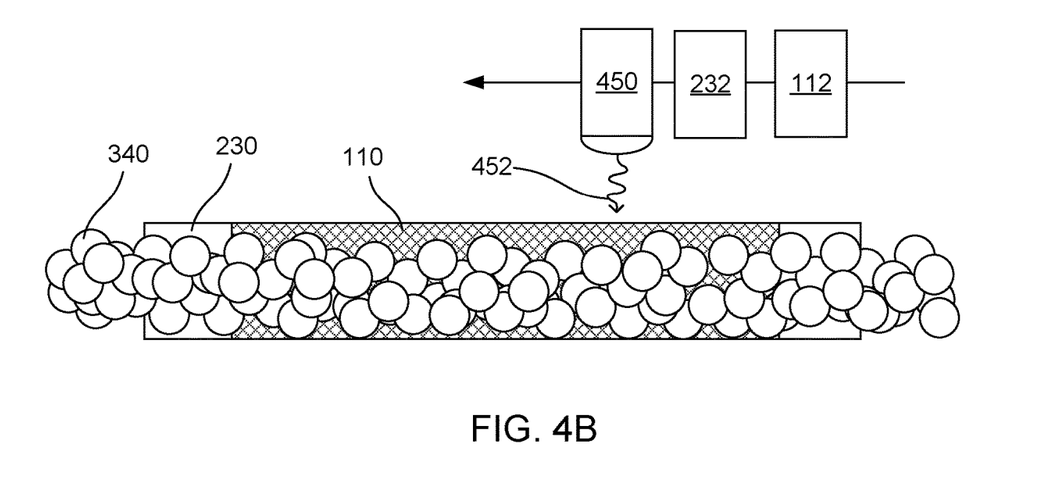
Figure 4C:
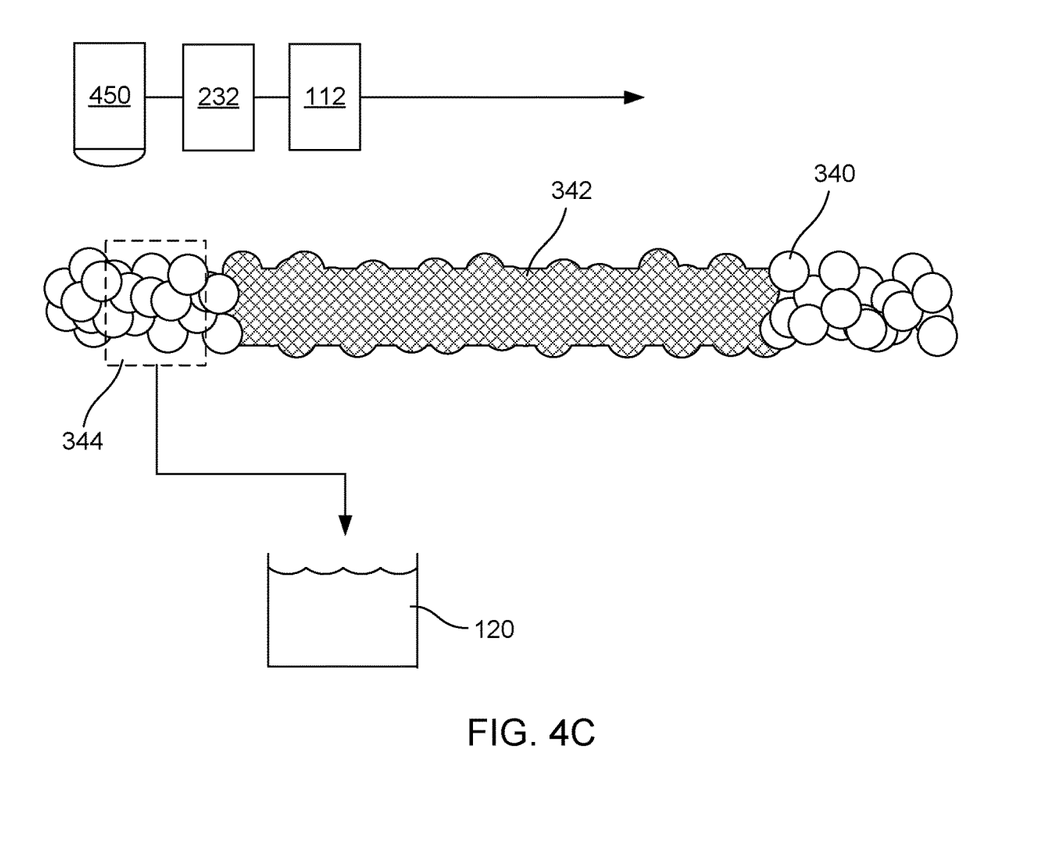

FIGS. 4A-4C illustrate one example of using the three-dimensional printing kits to form a three-dimensional printed object and then testing the powder bed material for contamination. In FIG. 4A, a fusing agent 110 and a detailing agent 230 are jetted onto a layer of powder bed material 340. The fusing agent is jetted from a fusing agent ejector 112 and the detailing agent is jetted from a detailing agent ejector 232. These fluid ejectors can move across the layer of powder bed material to selectively jet the fusing agent on areas that are to be fused, while the detailing agent is jetted onto surrounding powder bed material at the edges of the area to be fused. A radiation source 450 can also move across the layer of powder bed material.

FIG. 4B shows the layer of powder bed material after the fusing agent 110 and detailing agent 230 have been jetted onto the powder bed. The fusing agent has been jetted in an area of the polymer powder layer that is to be fused. The detailing agent has been jetted in areas adjacent to the edges of the area to be fused. In this figure, the radiation source 450 is shown emitting radiation 452 toward the layer of powder bed material 340. The fusing agent can include a radiation absorber that can absorb this radiation and convert the radiation energy to heat.

FIG. 4C shows the layer of powder bed material 340 with a fused portion 342 where the fusing agent was jetted. This portion has reached a sufficient temperature to fuse the polymer particles together to form a solid polymer matrix. The surrounding polymer particles where the detailing agent was jetted can have residues left after evaporation of the detailing agent. In this example, the detailing agent can also include a first pigment reactant. Therefore, some of the first pigment reactant can be on the polymer particles in the areas where the detailing agent was jetted. In many examples, the process of forming a layer of powder bed material, jetting the fusing and detailing agents, and irradiating the powder bed can be repeated to form additional layers, eventually forming the finished three-dimensional printed object. For purposes of illustration, FIG. 4C also shows how a powder bed material sample 344 can be taken from the powder bed and added to a detector solution 120. In this example, the powder bed material sample was contaminated by detailing agent and therefore included the first pigment reactant. This can react with the second pigment reactant in the detector solution to produce a visible color change.

Powder Bed Material

The powder bed material can include polymer particles having a variety of shapes, such as substantially spherical particles or irregularly-shaped particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 612, thermoplastic polyamide, polyamide copolymer powder, polyethylene powder, wax, polyvinylidene fluoride, polyvinylidene fluoride copolymer, poly(vinylidene fluoride-trifluoroethylene), poly(vinylidene fluoride-trifluoroethylene-chlorotrifluoroethylene), thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the powder bed build material. The fusing agent can include a radiation absorber that can absorb radiant energy and convert the energy to heat. In some examples, the fusing agent can also include a first pigment reactant. If recycled powder bed material is contaminated with the fusing agent, then the contamination can be detected by contacting the recycle powder bed material with a detector solution that includes a second pigment reactant to react with the first pigment reactant to form a colored pigment. Alternatively, if it is not desired to test powder bed material for contamination with the fusing agent then the fusing agent may not include the first pigment reactant.

In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an ink-jet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In alternative examples, the radiation absorber can preferentially absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 μm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™X-100; TRITON™X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT™ (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Additionally, the fusing agent can include a first pigment reactant if it is desired to detect contamination by the fusing agent in the powder bed material. In most examples, the fusing agent is applied to areas that are intended to be fused and become part of the finished three-dimensional printed object. Therefore, the amount of fusing agent that may contaminate surrounding powder bed material to be recycled can be small. However, some fusing agent may nevertheless contaminate surrounding powder bed material for a variety of reasons. Over time, this contamination can potentially build up and interfere with printing. In certain examples, powder bed material contaminated with fusing agent can be more likely fuse together when radiant energy is applied, even when such fusing is unwanted. This can reduce the selectivity between the area of the powder bed that is fused and the surrounding areas that are intended to be left unfused. Accordingly, it can be useful to include the first pigment reactant in the fusing agent so that fusing agent contamination in the powder bed material can be detected.

The amount of the first pigment reactant in the fusing agent can be adjusted so that the fusing agent is sufficiently detectable. At the same time, the amount of the first pigment reactant can be small enough that the function of the fusing agent is not significantly changed. In particular, the fusing agent can be effective to absorb radiant energy and convert the radiant energy to heat in order to fuse polymer particles. Additionally, in some examples the first pigment reactant can have a slight color that is less intense that the colored pigment formed by the reaction of the first pigment reactant and the second pigment reactant. If the first pigment reactant has a color, in some examples the amount of the first pigment reactant in the fusing agent can be small enough that the first pigment reactant does not impart a noticeable color to powder bed material on which the fusing agent is applied. In certain examples, the first pigment reactant can be present in an amount from about 0.01 wt % to about 2 wt %, or from about 0.02 wt % to about 1.5 wt %, or from about 0.05 wt % to about 1 wt % with respect to the total weight of the fusing agent.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or higher. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % to 100 wt %, or from 85 wt % to 99 wt % water. In further examples, the detailing agent can be about 95 wt % to 100 wt % water, or from 95 wt % to 99 wt %. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Additionally, the detailing agent can include a first pigment reactant if it is desired to detect contamination by the detailing agent in the powder bed material. The amount of the first pigment reactant in the detailing agent can be adjusted so that the detailing agent is sufficiently detectable. At the same time, the amount of the first pigment reactant can be small enough that the function of the detailing agent is not significantly changed. As mentioned above, the first pigment reactant can have a slight color that is less intense that the colored pigment formed by the reaction of the first pigment reactant and the second pigment reactant. If the first pigment reactant has a color, in some examples the amount of the first pigment reactant in the detailing agent can be small enough that the first pigment reactant does not impart a noticeable color to powder bed material on which the detailing agent is applied. In certain examples, the first pigment reactant can be present in an amount from about 0.01 wt % to about 2 wt %, or from about 0.02 wt % to about 1.5 wt %, or from about 0.05 wt % to about 1 wt % with respect to the total weight of the detailing agent.

Detector Solutions

The multi-fluid kits and three-dimensional printing kits described herein can also include a detector solution. The detector solution can be a liquid that includes water and a second pigment reactant. The second pigment reactant can be reactive with the first pigment reactant to form a colored pigment. As explained above, the first pigment reactant can be included in a fusing agent, detailing agent, and/or other fluid agent that is applied during the three-dimensional printing process.

In some examples, the detector solution can be a fluid that is not applied during the three-dimensional printing process. Unlike the fusing agent and detailing agent, which can be loaded in a three-dimensional printer and applied to the powder bed material during printing, the detector solution can be a separate fluid that is not loaded into the printer or used during the printing process. However, in other examples the three-dimensional printer can apply the detector solution to a sample of the powder bed material to test for contamination. For example, the three-dimensional printer can be capable of automatically applying detector solution to a sample of powder bed material before starting a print job in order to determine whether the powder bed material is contaminated.

In some examples, a sample of powder bed material can be removed from a three-dimensional printer and contacted with the detector solution to test the powder bed material for contamination. This can be done manually or using an automated system. In various examples, the powder bed material can be contacted with the detector solution by mixing the powder bed material into the detector solution, or by applying the detector solution to the powder bed material by jetting, spraying, pouring, or another method.

In certain examples, the detector solution can include any of the ingredients described above to increase jettability in the fusing agent or detailing agent. These ingredients can include a liquid vehicle, surfactant, dispersant, co-solvent, biocides, viscosity modifiers, materials for pH adjustment, sequestering agents, preservatives, and so on. These ingredients can be included in any of the amounts described above. In other examples, the detector solution may not be jetted and therefore may not include jettability imparting ingredients. In some examples, the detector solution can consist of water and the second pigment reactant without any other ingredients.

The amount of the second pigment reactant in the detector solution can be selected to provide good reaction with the first pigment reactant in contaminated powder bed material. In some examples, the amount of the second pigment reactant can be in excess of the amount that is consumed by reaction with the first pigment reactant in contaminated powder bed material. In certain examples, the amount of the second pigment reactant can be from about 0.01 wt % to about 20 wt %, or from about 0.05 wt % to about 10 wt %, or from about 0.1 wt % to about 8 wt % with respect to the total weight of the detector solution.

First and Second Pigment Reactants

As explained above, in some examples a first pigment reactant can be included in a fluid agent that is applied to the powder bed material during three-dimensional printing, and the detector solution can include a second pigment reactant that reacts with the first pigment reactant to form a colored pigment. As used herein, "first" and "second" can be interchangeable when used with respect to the pigment reactants. Therefore, the terms "first" and "second" are used for convenience to differentiate between the reactants and do not imply any particular order or position of the reactants.

A variety of colored pigments can be made by chemically reacting multiple reactants, e.g., two, three, etc. In some examples, the reactants can be water-soluble. These reactants can be dissolved in aqueous fluid agents that can be jetted onto the powder bed material in the three-dimensional printing methods described herein. The reactants can also be dissolved in water to make detector solutions as described herein. Although the reactants can be soluble, the pigment formed by the reaction may be water-insoluble.

In some examples, the pigment can be formed by reacting two reactants. One reactant can be included in a fluid agent used in three-dimensional printing and the other reactant can be in a detector solution. In other examples, the pigment may be formed by a reaction involving three reactants, or four reactants, for example. In some cases, the additional reactants can be included in either the fluid agent used in three-dimensional printing or in the detector solution, whichever is suitable.

In certain examples, the first pigment reactant and/or the second pigment reactant can include a metal salt. Specific examples can include $NH_4Fe(SO_4)_2 \cdot 12\ H_2O$, $(NH_4)_2Fe(SO_4)_2 \cdot 6\ H_2O$ $FeSO_4$, $NaOH$, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)e]$, $K_4[Fe(CN)_6]$, and combinations thereof. Several pigments can be formed by combining multiple reactants. Some examples of pigments that can be formed include iron oxide red, barium white, basic copper carbonate, zinc chrome yellow, Prussian blue, and others.

In some examples, the colored pigment formed by the first and second pigment reactants can be Prussian blue. Prussian blue is an oxidation product of ferrous ferrocyanide salt. Specifically, Prussian blue has the chemical formula $KFe[Fe(CN)_6]_{(5)}$. Prussian blue can be formed using the following reaction:

$$K^+_{(aq)} + Fe^{2+}_{(aq)} + [Fe(CN)_6]^{3-}_{(aq)} \rightarrow KFe[Fe(CN)_6]_{(5)}$$

In other examples, Prussian blue can also be formed using the following reaction:

$$k^+_{(aq)} + Fe^{3+}_{(aq)} + [Fe(CN)_6]^{4-}_{(aq)} \rightarrow KFe[Fe(CN)_6]_{(5)}$$

In a specific example, Prussian blue can be formed by reacting $FeSO_4$ with $K_3[Fe(CN)_6]$. Thus, the first pigment reactant in the first reactive agent can be $FeSO_4$ and the second pigment reactant in the second reactive agent can be $K_3[Fe(CN)_6]$.

In another example, the colored pigment can be iron oxide red. Iron oxide red has the chemical formula $Fe_2O_3$. This pigment can be formed using the following reaction:

$$2FeSO_4 + \tfrac{1}{2}O_2 + 4NaOH \rightarrow Fe_2O_3 + 2Na_2SO_4 + H_2O$$

Therefore, in some examples the first pigment reactant can be $FeSO_4$ and the second pigment reactant can be $NaOH$.

In yet another example, the colored pigment can be barium white. The chemical formula of barium white is $BaSO_4$. This pigment can be made by the following reaction:

$$BaCl_2 + Na_2SO_4 \rightarrow BaSO_4 + 2NaCl$$

Therefore, in some examples, the first pigment reactant can be $BaCl_2$ and the second pigment reactant can be $Na_2SO_4$.

In another example, the colored pigment can be basic copper carbonate. Basic copper carbonate has the chemical formula $Cu_2(OH)_2CO_3$. This pigment can be formed using the following reaction:

$$2CuSO_4 + 2Na_2CO_3 + H_2O \rightarrow Cu_2(OH)_2CO_3 + 2Na_2SO_4 + CO_2$$

Therefore, in some examples, the first pigment reactant can be $CuSO_4$ and the second pigment reactant can be $Na_2CO_3$. In another example, basic copper carbonate can be formed using the following reaction:

$$2CuSO_4 + 4NaHCO_3 Cu_2(OH)_2CO_3 + 2Na_2SO_4 + 3CO_2 + H_2O$$

Therefore, in other examples, the first pigment reactant can be $CuSO_4$ and the second pigment reactant can be $NaHCO_3$.

In still another example, the colored pigment can be zinc chrome yellow. Zinc chrome yellow has the chemical formula $ZnCrO_4$ and can be formed using the following reaction:

$$K_2CrO_4 + ZnSO_4 \rightarrow ZnCrO_4 + K_2SO_4$$

Therefore, in some examples, the first pigment reactant can be $K_2CrO_4$ and the second pigment reactant can be $ZnSO_4$.

In further examples, the colored pigment can be any pigment that is formable by combining multiple water-soluble reactants, e.g., two, three, four, etc. The reactants can be formulated into either a fluid agent used during three-dimensional printing (such as a fusing agent, detailing agent, and so on) or a detector solution.

Although certain reactants are identified as "first" and "second" herein, these can be interchangeable. Either of the reactants used to form a given pigment can be placed in the detector solution. The complimentary reactant can be placed in the fluid agent that may contaminate the powder bed material. In some examples, the reactant that is used in the fluid agent that is applied to the powder bed material can be selected based on the ability of the reactant to be included without negatively affecting the three-dimensional printing process. For example, if one of the pigment reactants has a stronger color on its own, then the reactant with the stronger color may be placed in the detector solution, while the reactant with a less intense color can be placed in the fluid agent to be applied to the powder bed material. Thus, the fluid agent can have little or no effect on the color of the powder bed material. In other examples, the reactant that is placed in the fluid agent to be applied to the powder bed material can be selected based on the ability of the reactant to be included without negatively affecting jettability of the fluid agent. In further examples, the reactant can be selected based on its oxidation state. If one of the pigment reactants has a higher oxidation state, in some examples the reactant with the higher oxidation state can be included in the fluid agent to be applied to the powder bed material. In some cases, reactants with lower oxidation states can be susceptible to being oxidized at the high temperatures used during three-dimensional printing. Therefore, in some examples the higher oxidation state reactant can be included in the fluid agent and the lower oxidation state reactant can be included in the detector solution.

Methods of Testing Powder Bed Material for Contamination

Figure 5:
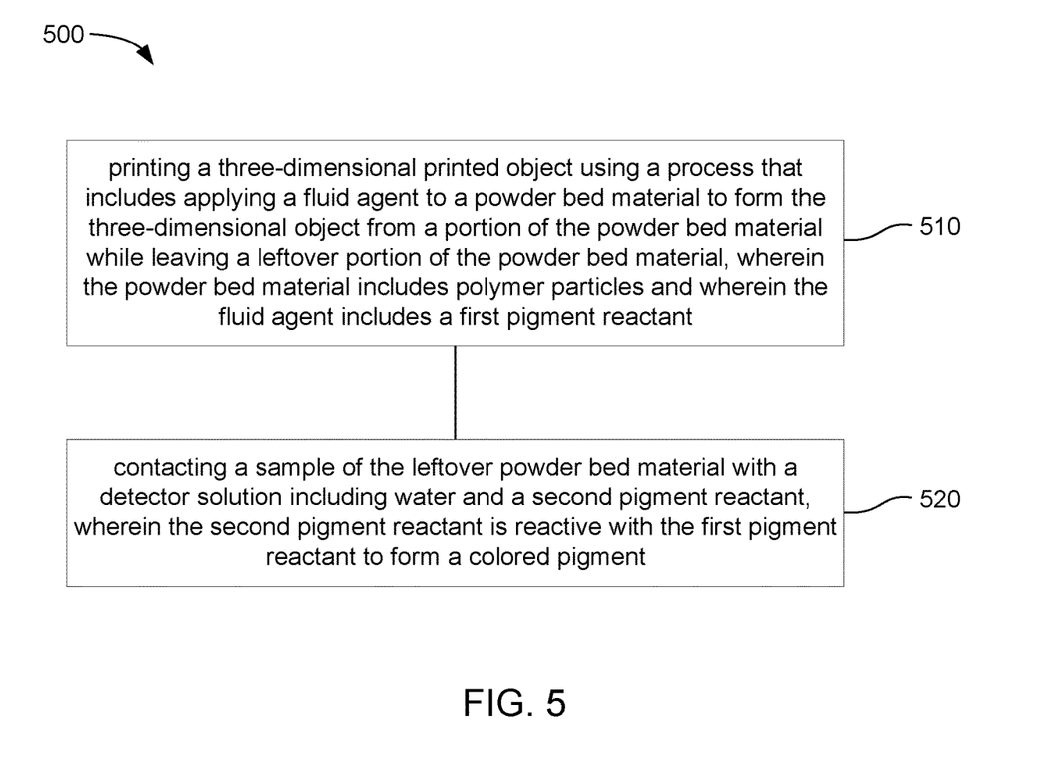
FIG. 5 is a flowchart illustrating an example method of testing powder bed material for contamination in accordance with examples of the present disclosure.

The present disclosure also describes methods of testing powder bed material for contamination. FIG. 5 shows a flowchart illustrating one example method 500 of testing powder bed material for contamination. The method includes: printing a three-dimensional printed object using a process that includes applying a fluid agent to a powder bed material to form the three-dimensional object from a portion of the powder bed material while leaving a leftover portion of the powder bed material, wherein the powder bed material includes polymer particles and wherein the fluid agent includes a first pigment reactant 510; and contacting a sample of the leftover powder bed material with a detector solution including water and a second pigment reactant, wherein the second pigment reactant is reactive with the first pigment reactant to form a colored pigment 520.

In certain examples, the process used to print the three-dimensional printed object can be any of the processes described herein. In a particular example, the three-dimensional printing process used can include iteratively applying individual powder bed material layers including polymer particles to a powder bed. Based on a three-dimensional object model, a fusing agent can be selectively jetted onto the individual powder bed material layers. The fusing agent can include water and a radiation absorber. In certain examples, a detailing agent can also be jetted onto the powder bed material layers based on the three-dimensional object model. As explained above, a first pigment reactant can be included in the fusing agent, or the detailing agent, or another fluid agent that is applied during printing, or any combination thereof. The individual powder bed material layers can be exposes to radiant energy to selectively fuse the polymer particles in contact with the radiation absorber to form a fused polymer matrix at individual powder bed material layers. The powder bed material, fusing agent, and detailing agent can have any of the ingredients and properties described above.

Because contamination of the powder bed material can occur during the three-dimensional printing process, in some examples the powder bed material can be sampled and tested for contamination after an object has been printed in the powder bed. In a particular example, an object can be printed using the printing process described above, and then the finished object can be removed from the powder bed. Leftover loose powder bed material in the powder bed can then be sampled and testing for contamination by contacting the sample with the detector solution. As mentioned above, this can be performed by a variety of methods such as mixing the powder bed material sample with the detector solution or applying the detector solution to a portion of the powder bed. In certain examples, it may be useful to determine if the powder bed is contaminated in certain spatial locations. In such an example, a sample or multiple samples of powder bed material can be selected from specific locations in the powder bed. In other examples, the powder bed material may be recycled material that has previously been used for printing a three-dimensional printed object or multiple three-dimensional printed objects. This recycled powder bed material may have been mixed since the previous use. This recycled material can be sampled and testing for contamination before starting a new print job with the powder bed material.

In further examples, testing the powder bed material for contamination can be performed in order to decide whether to continue to use recycled powder bed material or to discard the material. In some such examples, a sample of the recycled powder bed material can be contacted with the detector solution. If a color change is observed then the recycled powder bed material can be discarded, or if no color change is observed then the recycled powder bed material can be used again. Alternatively, a threshold color intensity can be determined, and if the color of the detector solution mixed with the powder bed material is above the threshold color intensity then the powder bed material can be discarded, while if the color is below the threshold color intensity, then the powder bed material can be used again.

In other examples, the powder bed material can be tested for contamination in order to determine whether to adjust print mode parameters. For example, if a sufficient level of contamination is found in the powder bed material, then the print mode can be adjusted by changing parameters such as preheating temperature, radiant energy intensity, amount of detailing agent applied, or others. Such changes in print mode can be made to counteract effects of the contamination on the printing process.

In still further examples, the color intensity of the detector solution mixed with the powder bed material sample can be used to estimate the concentration of contaminants in the powder bed material. Higher levels of contamination in the powder bed material can form larger amounts of colored pigment, and therefore create a higher color intensity. A correlation curve can be made by contacting detector solution with samples of powder bed material having known amounts of the first pigment reactant, observing the different color intensities by these samples, and correlating the color intensities with the amounts of the first pigment reactant. In some examples, the color intensity can be quantified visually by a human eye or using an analytical method such as UV-vis spectroscopy. In certain examples, three-dimensional printers can include an automated system for applying detector solution to recycled powder bed material and measuring the color intensity using such an analytical method.

In more specific examples of the three-dimensional printing processes that can be used to make the three-dimensional printed objects, a detailing agent can be used to cool the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The three-dimensional printed object can be formed by jetting a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with detailing agent. In other examples, the object can be defined by a first three-dimensional object model a second three-dimensional object model can define areas to jet the detailing agent. In further examples, the jetting of the detailing agent may not be controlled using a three-dimensional object model, but using some other parameters or instructions to the three-dimensional printing system. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description mentions pigment colorants, the term "pigment" can be used to describe pigment colorants, and also other pigments such as organo-metallics, ferrites, ceramics, etc. In one specific aspect, however, the pigment is a pigment colorant. A "pigment reactant" on the other hand is not a pigment per se, but rather a component that reacts with another "pigment reactant" to form a pigment.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

An example detector solution was prepared by mixing deionized water and potassium hexacyanoferrate(II) (the second pigment reactant) at a ratio of 1:0.05. A sample detailing agent was prepared by adding 0.05 wt % ammonium iron(III) sulfate dodecahydrate (the first pigment reactant) to a detailing agent used in a three-dimensional printing process as described herein. A sample powder bed material was also prepared, which was a sample of polyamide 12 powder that is also used in a three-dimensional printing process as described herein.

Example 2

A simulated contaminated powder bed material was made by mixing the powder bed material of Example 1 with the detailing agent of Example 1 at a weight ratio of 1:0.4. One gram of this simulated contaminated powder bed material was added to 10 grams of the detector solution from Example 1. The vial containing the detector solution and powder bed material was shaken to mix the contents well. This immediately produced a noticeable color change. The mixture turned a light blue color, indicating the formation of Prussian blue pigment. As a control, one gram of clean polyamide 12 powder was added to a second vial with 10 grams of the detector solution and shaken. This mixture did not have any color change. These results show that the detector solution can be used to successfully detect the first pigment reactant contaminating the powder bed material.

What is claimed is:

1. A method of testing powder bed material for contamination, the method comprising:
   printing a three-dimensional printed object using a process that includes applying a fusing agent to a powder bed material to form the three-dimensional object from a portion of the powder bed material while leaving a leftover portion of the powder bed material, wherein the powder bed material comprises polymer particles and wherein the fusing agent comprises a first pigment reactant; and
   determining whether the leftover portion of the powder bed material is contaminated with the fusing agent by contacting a sample of the leftover portion of the powder bed material with a detector solution comprising water and a second pigment reactant, wherein the second pigment reactant is reactive with the first pigment reactant to form a colored pigment indicating contamination of the sample with the fusing agent.

2. The method of claim 1, further comprising:
contacting the detector solution with multiple samples of the leftover portion of the powder bed material contaminated with known amounts of the first pigment reactant;
so as to generate different color intensities formed from the known amounts of the first pigment reactant in the multiple samples; and
generating a correlation curve by correlating the color intensities with the known amounts of the first pigment reactant.

3. The method of claim 1, further comprising:
observing the sample contacted with the detector solution to determine a color intensity of the detector solution; and
either:
discarding a remainder of the leftover powder bed material if the color intensity is at or above a threshold color intensity; or
recycling the leftover powder bed material for forming an additional three-dimensional printed object if the color intensity is below the threshold color intensity.

4. The method of claim 1, wherein the first pigment reactant is $NH_4Fe(SO_4)_2 \cdot 12\ H_2O$ and the second pigment reactant is $K_4[Fe(CN)_6]$.

5. The method of claim 1, wherein the fusing agent further comprises water and an electromagnetic radiation absorber.

6. The method of claim 1, wherein at least one of the first pigment reactant and the second pigment reactant includes a metal salt.

7. The method of claim 6, wherein the metal salt is selected from the group consisting of $NH_4Fe(SO_4)_2 \cdot 12\ H_2O$, $(NH_4)_2Fe(SO_4)_2 \cdot 6H_2O$, $FeSO_4$, $NaOH$, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)_6]$, $K_4[Fe(CN)_6]$, and a combination thereof.

8. The method of claim 1, wherein the first pigment reactant is present in the fusing agent in an amount ranging from about 0.01 wt % to about 2 wt %.

9. The method of claim 1, wherein the fusing agent is colorless.

10. The method of claim 1, wherein the fusing agent is a low tint fusing agent.

11. The method of claim 1, wherein the printing further includes applying a detailing agent to the powder bed material, wherein the detailing agent includes the first pigment reactant.

12. The method of claim 11, wherein the applying of the detailing agent is accomplished utilizing an inkjet printhead.

13. The method of claim 1, wherein the polymer particles are selected from the group consisting of polyamide 6 particles, polyamide 9 particles, polyamide 11 particles, polyamide 12 particles, polyamide 66 particles, polyamide 612 particles, polyamide copolymer particles, polyethylene particles, thermoplastic polyurethane particles, polypropylene particles, polyester particles, polycarbonate particles, polyether ketone particles, polyacrylate particles, polystyrene particles, polyvinylidene fluoride particles, poly(vinylidene fluoride-trifluoroethylene) particles, poly(vinylidene fluoride-trifluoroethylene-chlorotrifluoroethylene) particles, wax particles, and a combination thereof.

14. The method of claim 1, wherein the applying of the fusing agent is accomplished utilizing an inkjet printhead.

* * * * *